2,890,686
ENGINE LIQUID COOLING SYSTEM

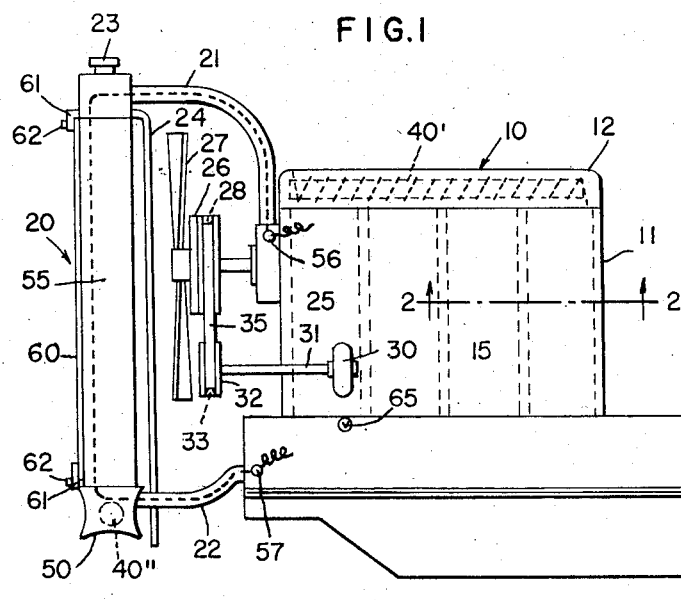

William C. Cassell, Toledo, Ohio

Application June 19, 1958, Serial No. 743,059

7 Claims. (Cl. 123—41.5)

The present invention relates to a new and novel engine liquid cooling system, and more particularly to a cooling system especially adapted for operation where the engine is subjected to freezing temperatures.

Internal combustion and similar type engines as used, for example, in automobiles and the like generally employ liquid cooling systems wherein the engine is provided with cavities about the cylinders, and a suitable coolant, such as water, is circulated in the cavities so as to conduct the heat away from the cylinders. Such cooling systems ordinarily employ a radiator which is subjected to a flow of air, the radiator providing a large radiating surface which serves to cool the liquid coolant as it flows through the radiator and back to the engine. Such liquid cooling systems for engines are well known in the art, and have presented certain long standing problems in the art.

A major problem encountered with engine liquid cooling systems is the tendency of the liquid coolant to freeze when subjected to low temperatures. Since automobile engines and the like are often operated in climates wherein the temperature drops below the freezing point, it is necessary to provide some means for preventing damage to the engine at low temperatures. It is obvious that if the liquid coolant in the engine is allowed to freeze solid without providing some means for compensating for such freezing, the block of the engine or other components may be cracked or otherwise seriously damaged.

The method most commonly used in present day practice for preventing damage to liquid cooled engines is to add a suitable anti-freeze solution to the water or other coolant in the system. This anti-freeze solution lowers the freezing point of the liquid coolant to a sufficient degree such that the liquid will not be frozen solid even though the temperature should drop below the freezing point. Of course, there are certain limitations to this type of procedure due to the fact that such solutions are rather expensive, and if extremely low temperatures are encountered it becomes a very expensive proposition to provide the cooling system with sufficient anti-freeze solution to lower the freezing point of the liquid coolant to the desired degree.

Although anti-freeze solutions are generally satisfactory in common applications, they do not provide a foolproof system, and the uncertainty of the protection employed has been such that it has been a common practice to drain the cooling system completely in cold weather rather than run the risk of the engine being damaged by a freeze-up. Many operators of such liquid cooled engines also allow the engine to idle for many hours so that it can never cool down to a point where there is a possibility of the liquid coolant freezing. It is apparent that such precautions in order to prevent freezing are not desirable and indicate the inadequacy of ordinary anti-freeze solutions.

In accordance with the present invention, it is an important novel concept to provide a system wherein the necessity of utilizing anti-freeze solution is entirely eliminated. Eliminating anti-freeze solutions has a number of advantages. When there is no anti-freeze solution, the engine may be operated at higher temperatures without boiling away the anti-freeze. It is well recognized that one of the disadvantages of employing anti-freeze solution is the fact that the solution will eventually be boiled away if the engine is operated at high temperatures, thereby eliminating freezing protection from the system without giving the operator of the engine any warning. The cooling system according to the present invention only employs a suitable coolant such as water, and water, for example, will not block the channels of the cooling system as quickly as water with anti-freeze solution added to it. In addition, small leaks in the cooling system are not so serious when only water is employed in the cooling system since water may be very easily and cheaply replaced, whereas when expensive anti-freeze solution is lost through leakage, it, of course, is a very expensive procedure to replace such solution.

An important advantage of the present invention is the fact that higher engine temperatures may be provided for subsequent starting of the engine after the engine has been subjected to freezing temperatures. This is accomplished in accordance with a novel principle employed in the present invention. It has been a common practice in the prior art to provide extensive and complex arrangements for preventing freezing of the liquid coolant. In contrast to this concept, the present invention permits freezing of the liquid coolant, and provides a very compact and simple arrangement for preventing damage to the engine upon such freezing. By permitting the water or similar coolant to actually freeze, the latent heat of the liquid coolant is entirely liberated during the change of state of the liquid coolant from a liquid to a solid, thereby transferring a maximum amount of energy to the engine before the engine temperature can be lowered much below the freezing point. This latent heat will not be liberated in prior art systems which do not permit freezing of the liquid coolant due to the addition of anti-freeze solution. It is accordingly apparent that by allowing the liquid to freeze, the temperature of the engine will not drop as low as it would in a given period of time when a liquid coolant having an anti-freeze solution therein is employed. The temperature of the engine will accordingly be higher when it is started after freezing with the present invention, thereby providing a very advantageous result since it will naturally be easier to thaw out the engine where the initial temperature is higher.

Since the liquid coolant in the system of the present invention is allowed to freeze solid, provision is made for accommodating the expansion of the liquid coolant without causing damage to the engine or radiator. In order to protect the block and head of the engine itself, compressible members are inserted in the cavities of the cooling system. These compressible members are formed of an elastic deformable material such that upon expansion of the liquid coolant, the compressible members are compressed to occupy a smaller volume thereby compensating for the enlarged volume of the liquid coolant. Similar compressible members may also be provided in the radiator of the system in order to prevent damage to the radiator. The radiator is provided with an additional means for compensating for changes in volume of the coolant within the radiator. The walls of the radiator are formed of thin flexible material of a generally concave configuration. Upon freezing of the coolant within the radiator, these thin concave walls are adapted to expand outwardly, thereby compensating for the enlarged volume of liquid coolant within the radiator.

Since the liquid coolant is allowed to freeze solid in the invention system, it is apparent that when the engine is initially started after such freezing, there will be no open path of flow for circulating water. In order to initially thaw out at least a small path through the cooling system, a heating element preferably in the form of an insulated wire extends through the hoses connecting the radiator to the engine block and down through a portion of the radiator. The heating element is energized after starting of the engine, and quickly thaws out a small path through the radiator of the cooling system. A small amount of water is thereby initially permitted to circulate through the system, and the heat of the cylinders will then serve to further thaw the system such that it eventually will be completely open and water will freely circulate throughout the cooling system. The heating element is controlled by a suitable switch mounted in a convenient location such that the operator of the engine may actuate the heating element from a remote position as desired.

The radiator of the invention system also supports a shield means adjacent the heating element of the system such that air is prevented from impinging upon the radiator adjacent the heating element to thereby permit the heating element to quickly thaw the system while preventing additional cooling of this particular portion of the system which would occur if cooling air were allowed to impinge on this portion of the radiator. As an additional feature of the invention, the overflow pipe of the radiator preferably extends downwardly adjacent the heating element such that the overflow pipe will also be quickly thawed upon energization of the heating element. As an additional safety feature, the system is also provided with a relief valve for relieving internal pressure of small isolated cavities of the system which may not be adequately protected by the aforementioned compressible members.

Liquid coolant water systems of this type also generally employ a liquid pump for circulating the liquid through the system. This pump in the present system will, of course, also be frozen solid when the engine is started subsequent to freezing of the coolant within the system. In order to protect the water pump and prevent damage thereto when it is frozen solid, the present invention employs a slipping drive connection between the pump and the drive shaft for driving the pump. This slipping drive connection will not transmit sufficient drive to the pump when the pump is frozen solid, thereby preventing damage to the pump. The slipping drive is accomplished according to the present invention in a very expeditious manner by providing a pulley and belt driving interconnection wherein the pulley is provided with a groove having flat bottom and flat side walls and the driving belt is provided with a complementary configuration such that the belt will slip with respect to the groove when the pump is frozen.

An object of the present invention is to provide a new and novel engine liquid cooling system which completely eliminates the necessity of providing anti-freeze solution in the system.

Another object of the present invention is the provision of an engine cooling system which provides higher engine temperatures for starting.

A further object of the present invention is to provide an engine liquid cooling system wherein the seriousness of leakage in the system is reduced to a minimum.

Another object of the present invention is to provide an engine liquid cooling system wherein provision is made for allowing the liquid coolant within the system to freeze solid.

Yet another object of the invention is the provision of an engine liquid cooling system which is quite compact, simple and inexpensive in construction, and yet which is quite efficient and reliable in operation.

Other objects and many attendant advantages of the invention will become more apparent when considered in connection with the accompanying specification and drawings wherein:

Fig. 1 is a side view of an engine incorporating the cooling system according to the present invention;

Fig. 2 is a sectional view taken along line 2—2 of Fig. 1 looking in the direction of the arrows;

Fig. 3 is a top view of the apparatus shown in Fig. 1;

Fig. 4 is a sectional view taken along line 4—4 of Fig. 3 looking in the direction of the arrows;

Fig. 5 is an enlarged view of one of the compressible members of the present invention;

Fig. 6 is an end view of the compressible member shown in Fig. 5; and

Fig. 7 is an enlarged sectional view of the relief valve employed in the invention system.

Referring now to the drawings wherein like reference characters designate corresponding parts throughout the several views, there is shown in Figs. 1 to 4 an engine indicated generally by reference numeral 10 including a block portion 11 and a head portion 12 of conventional construction. As shown, the engine has four conventional cylinders 15, although it is apparent that the present invention may be incorporated in an engine employing any number of cylinders as desired. A water jacket 16 surrounds the cylinders in spaced relationship thereto in a well known manner, and defines cooling cavities between the walls of the water jacket and the walls of the cylinders. The various cooling cavities of the engine are interconnected with one another such that liquid coolant such as water is adapted to flow therethrough.

A radiator indicated generally by reference numeral 20 is disposed at the forward end of the engine, and in automobiles or like vehicles, the radiator is generally positioned at the forward end of the vehicle such that upon movement of the vehicle, air will pass around the various cooling surfaces of the radiator for cooling the liquid coolant as it flows therethrough. The radiator is of conventional construction, being hollow and including a number of separate fluid conduits. The radiator is connected to the cooling cavities within the engine by means of a hose 21 which conducts liquid coolant from the engine to the upper portion of the radiator and by a second hose 22 which connects the lower portion of the radiator to the engine for returning the cooled water from the radiator to the engine. A conventional filling cap 23 is provided at the upper portion of the radiator for filling the radiator with coolant, and an overflow pipe 24 extends from the upper portion of the radiator to a point adjacent the lower surface thereof for draining off overflow from the radiator.

A drive shaft 25 extends forwardly from the engine and is normally rotated whenever the engine is operating. A pulley 26 is fixed to shaft 25 and a fan 27 is also fixed to the shaft such that the pulley and fan continuously rotate while the engine is operating. The fan 27 serves to cool the engine by directing a blast of air rearwardly toward the engine in a well known manner.

A conventional water pump 30 is mounted upon the side wall of the engine and is preferably disposed adjacent one of the cylinders of the engine such that the water pump will be heated by the heat developed within the adjacent cylinder. A shaft 31 operatively connected to the water pump extends forwardly therefrom and has a pulley 32 fixed on the outer end thereof. Pulleys 26 and 32 are provided with grooves 28 and 33 respectively which receive a connecting driving belt 35 therein. The side walls and bottom of each of the grooves are flat, and the cooperating surfaces of the belt which engage these surfaces are similarly formed as flat surfaces. With this construction, a slipping driving connection is provided between the pulleys and the belt in contrast to the conventional V-type groove and belt surfaces which will not slip with respect to one another. By providing this driving interconnection to the water pump connected in the cooling system of the present invention, damage is prevented from occurring to the water pump when the water pump is frozen after the engine has been subjected to low temperatures. If the water pump is frozen when the engine is started, the slipping driving interconnection provided by the pulleys and driving belt prevent the pump from being turned over and accordingly will insure that the parts of the pump are not damaged due to movement while the pump is frozen. It is apparent that upon thawing of the pump and the water or other liquid coolant therein, the pulleys and belt will provide an efficient driving connection such that the pump will be operated in the desired manner.

The liquid coolant within the engine is allowed to freeze in the cooling system of the present invention, and in order to compensate for the initial expansion of the liquid coolant as it freezes, compressible members are disposed within the various cavities of the cooling system. Referring now to Figs. 5 and 6, one of the compressible members is illustrated and comprises a substantially cylindrical hollow member 40 formed of a suitable elastic deformable material such as rubber and having the opposite ends 41 thereof sealed such that atmospheric pressure exists within the closed cavity in the center of the member. It is apparent that when the surrounding coolant freezes, the walls of hollow member 40 may be compressed such that the compressible member occupies a smaller volume, thereby compensating for the enlarged volume of the coolant. In order to space the compressible member from the surrounding wall portions and to insure that it stays in proper operative position within the associated cavity, a spacer means is provided about each compressible member.

As seen in Figs. 5 and 6, the spacer means is in the form of an elongated wire 45 having a substantially spiral configuration with the end portions 46 thereof of decreased diameter and disposed adjacent the end walls 41 of the compressible member. End portions 46 prevent the end walls of the compressible member from contacting the surrounding walls of the engine, and in addition prevent the compressible member 40 from being displaced relative to the surrounding spacer means 45. Although compressible member 40 has been shown as being hollow, it is apparent that it may also be of a solid construction as long as the material thereof is sufficiently deformable and elastic to alter its volume to a relatively large extent. In any case, the compressible member itself will be provided with a suitable surrounding spacer means in order to maintain it in proper position.

As seen in Figs. 2 and 4, a plurality of compressible members 40 are disposed within the various cavities defined between the cylinders and the surrounding walls of the water jacket of the cooling system. The spacer means 45 of each of the compressible members prevents the compressible members from actually engaging the surrounding wall portions and further insures that the liquid coolant will be able to flow around the compressible members such that free circulation of the liquid coolant is insured at all times throughout the various cavities of the cooling system. In addition, compressible members 40' similar to compressible members 40 may be disposed in the head of the engine in order to compensate for freezing of liquid coolant within the head.

Referring again to Fig. 1 of the drawings, the bottom walls 50 of the radiator are formed of thin flexible material and are provided with a substantially concave configuration such that upon expansion of the liquid coolant therein, these thin flexible walls will bulge outwardly to compensate for expansion of the liquid coolant. Upon subsequent thawing of the system and melting of the liquid coolant, walls 50 will return to their concave position as seen in Fig. 1. As an additional safety feature, a compressible member 40" similar to compressible members 40 disposed in the engine is preferably disposed within the lower portion of the radiator for additionally compensating for expansion of the liquid coolant upon freezing. The concave wall portions 50 are so designed that they will adequately compensate for expansion of the adjacent liquid coolant without reaching the elastic limit of the walls such that they will always return to their initial position as shown. To protect the top of the radiator, the system is only filled slightly above the tops of the radiator coils in the radiator such that a space is provided at the top of the radiator for accommodating expansion of the coolant therein.

Since the liquid within the entire cooling system is allowed to freeze solid, a heating element is provided for initially thawing the cooling system. The heating element, according to the present invention, is preferably in the form of a conventional insulated electrical resistance wire of Nichrome or similar material and is indicated by reference numeral 55, the heating wire extending from a suitable insulator connector 56 secured to the block of the engine through hose 21, downwardly through one of the tubes of the radiator, through the lower portion of the radiator and back through hose 22 to a point 57 where it is connected to the block of the engine. The heating wire is connected to the storage battery of the electrical circuit of the engine (not shown), and a suitable connection is provided to a switch (not shown) provided at a remote location where the operator of the engine may control energization of the heating wire. In an automobile, for example, the switch for energizing the heating wire will be provided on the dashboard such that the driver of the car may conveniently energize the heating element when desired.

An elongated wind shield member 60 is supported from the forward surface of the radiator and is disposed adjacent the tube of the radiator within which heating wire 55 extends. It is apparent that wind shield member 60 will prevent wind from impinging upon that portion of the radiator within which the heating element is disposed such that when the vehicle is moving, the heating element may quickly thaw that portion of the radiator within which it is disposed without allowing cooling air to impinge upon this portion of the radiator and tend to cool it. Wind shield member 60 extends from the top to the bottom of the radiator, and is preferably mounted by means of brackets 61 secured to the forward portion of the radiator by bolt assemblies 62 to permit quick and easy installation and removal of the wind shield with respect to the radiator. The overflow pipe 24 is disposed adjacent the tube within which the heating element extends such that the overflow pipe is also protected from impingement by the cooling air flowing around the radiator by wind shield member 60.

As seen in Fig. 1, a relief valve indicated generally by reference numeral 65 is also provided in the block of the engine as an additional safety feature. Although compressible members 40 ordinarily will provide adequate compensation for expansion of the coolant within the cavities of the cooling system upon freezing, there may be small isolated cavities within which the pressure may not be adequately relieved, and accordingly relief valve 65 may be connected to such cavities for relieving the pressure therein. As an example, the small cavities adjacent the waterpump may develop dangerous pressures therein, and relief valve 65 may be in communication therewith.

As seen more particularly in Fig. 7, relief valve 65 is of very simple construction and includes a substantially cylindrical metallic housing 66 which is suitably mounted within the block of the engine. An elastic deformable member 67 is fitted within housing 66 of the relief valve and is adapted to extend within the chamber, the pressure of which it is desired to relieve. This chamber would generally be the last one of the chambers of the cooling system which would freeze, and accordingly would be the chamber which would of necessity have to be relieved of pressure if it is too small to mount a compressible member therein. Rubber member 67 of the relief valve has a longitudinally extending opening 68 in the center portion thereof, and opening 68 communicates with a split portion 69 composed of a plurality of segments of similar configuration, for example four in number, which completely fill the interior of metallic housing 66 and which normally have the adjacent surfaces thereof in contact with one another for sealing the space within housing 66. The mating surfaces 70 of the various segments of portion 69 are adapted to be forced away from one another when subjected to a predetermined pressure such that an opening will be provided through portion 69 which communicates with the aforementioned opening 68. It is accordingly apparent that the relief valve will ordinarily be sealed, but when subjected to a predetermined pressure which may be developed upon freezing of the liquid coolant, portion 69 will open such that the pressure within opening 68 of the relief valve is relieved to atmosphere thereby preventing the development of excessive pressure within the block of the engine. For example, relief valve 65 may be designed such that it will open at a pressure of approximately 50 p.s.i.

In operation, when the engine is subjected to freezing temperatures, the liquid coolant within the engine may freeze solid if the engine is subjected to low temperatures for a sufficient period of time. The compressible members 40, 40' and 40'' within the engine block, the engine head and the radiator plus the thin flexible concave walls 50 of the radiator will compensate for expansion of the liquid collant as it freezes, thereby preventing damage to the engine or the radiator. When it is desired to subsequently start the engine, as pointed out previously the fact that the water has frozen will have liberated the latent heat of the coolant liquid thereby enabling the engine to remain at a higher temperature than would be possible if a liquid containing anti-freeze solution were employed. It will accordingly be a simpler matter to start and thaw the engine.

When the engine is initially turned over, if the water pump is frozen, the slipping drive connection provided by pulleys 28, 32 and belt 35 will prevent the pump from being turned over and thereby protect the pump from damage. The cylinders of the engine will, of course, heat the surrounding liquid coolant, and the operator of the engine can observe the temperature on a suitable gauge to determine if the heat due to the cylinders is adequate to thaw out the system. If after approximately ten minutes the temperature of the engine goes up to about the boiling point, it is apparent that the cooling system is not adequately thawed and that the liquid coolant therein is not circulating properly. The operator of the engine then actuates a switch to energize the heating element 55. This heating element quickly thaws a small path from the engine through the radiator of the cooling system thereby initiating a small path of flow throughout the cooling system. Once this small path of freely circulating coolant is provided, the remainder of the system will quickly be thawed as the heated coolant is circulated in the system. As soon as the liquid coolant is freely circulating within the system, the temperature of the engine as indicated on the gauge will drop, and the operator of the engine may de-energize the heating element.

It is apparent from the foregoing that there is provided a new and novel engine liquid cooling system wherein the necessity of providing anti-freeze solution is completely eliminated. The engine is provided with higher engine temperatures which facilitate starting after freezing, the seriousness of leaks in the system is minimized since only a cheap, easily obtainable liquid coolant is employed in contrast to prior art systems which require expensive anti-freeze solutions. The cooling system according to the present invention is quite simple, compact and inexpensive in construction, and yet is quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. An engine liquid cooling system comprising an engine body means having outer walls, and including a plurality of cylinders therein, cooling spaced defined between the cylinders and said walls of the body means, a plurality of compressible members disposed in said cooling spaces, each of said compressible members being formed of an elastic resilient material for accommodating expansion of liquid coolant in said spaces, and spacer means disposed in surrounding relationship to each of said compressible members for maintaining said compressible members in proper operative position spaced from the surrounding walls of the spaces.

2. Apparatus as defined in claim 1 wherein each of said compressible members is substantially cylindrical in configuration and each of said spacer means comprises an elongated member of spiral configuration disposed closely about the compressible members thereby insuring intimate contact of the spacer means and the compressible members, and yet permitting flow of liquid coolant about the compressible members.

3. An engine liquid cooling system comprising an engine body means having cylinders therein, a water jacket surrounding said cylinders and defining cooling spaces between said water jacket and said cylinders for receiving a liquid coolant, said spaces comprising part of a liquid cooling system, compressible members disposed within said spaces, each of said compressible members being formed of an elastic rubber-like material and being substantially cylindrical in configuration, elongated spacer means surrounding each of said compressible members and having a spiral configuration for maintaining said compressible members in proper operative position spaced from the cylinders and the water jacket, drive shaft means supported by said engine body, a water pump supported by said engine body and connected in said liquid cooling system, a slipping driving connection between said drive shaft and said pump for preventing damage of the pump when it is frozen, a hollow radiator being connected to said spaces by means of hollow connecting hoses for providing communication between the spaces and the interior of the radiator, the bottom walls of said radiator being formed of flexible material and having a concave configuration for accommodating for expansion of liquid coolant therein, compressible means disposed within said radiator for additionally accommodating for expansion of liquid coolant in the radiator, a heating element extending through said radiator for heating at least a portion of said radiator, and windshield means supported by said radiator adjacent said heating element for preventing air from impinging on the radiator adjacent said heating element.

4. An engine liquid cooling system comprising an engine body means having cooling cavities therein for receiving a liquid coolant, compressible means disposed within said cavities adapted to be compressed upon expansion of the liquid coolant due to freezing, hollow radiator means connected in communication with said engine cooling cavities, said radiator including deformable wall portions for accommodating expansion of liquid coolant in the radiator, and spacer means disposed in said cavities for maintaining said compressible means in operative position spaced from the adjacent walls of said cavities.

5. An engine liquid cooling system comprising an engine body means provided with cooling chambers comprising part of a liquid cooling system, hollow radiator means connected in communication with said engine cooling chambers, compressible means disposed in said chambers for accommodating freezing of liquid coolant in the chambers, said radiator including flexible wall portions for accommodating freezing of liquid coolant in the radiator, a heating element extending through said radiator for heating a portion of said radiator, and windshield means supported by said radiator adjacent said heating element for deflecting air away from that portion of the radiator adjacent the heating element.

6. An engine liquid cooling system including an engine body means having a plurality of cylinders therein surrounded by a water jacket defining cooling spaces between the cylinders and the water jacket, said spaces comprising part of a liquid cooling system, said liquid cooling system including a water pump, said engine including a drive shaft for driving said water pump and a driving connection between said drive shaft and said pump, said driving connection including a pulley having a groove with flat bottom and side walls formed therein, a complementary shaped belt received within said groove thereby providing a slipping drive connection between the drive shaft and the water pump when the water pump is frozen, compressible means disposed within said spaces for accommodating freezing of the liquid coolant in the spaces, hollow radiator means connected in communication with said engine cooling spaces, said radiator having deformable means for accommodating for freezing of liquid coolant in the radiator, and means for heating at least a portion of the interior of said radiator for thawing frozen coolant, said radiator also having compressible means disposed therein, each of said compressible means comprising a hollow sealed member formed of elastic material, each of said members having spacer means disposed thereabout for maintaining the compressible means in proper operative position spaced from the surrounding wall portions.

7. An engine liquid cooling system including an engine body means having a plurality of cylinders therein surrounded by a water jacket defining cooling spaces between the cylinders and the water jacket, said spaces comprising part of a liquid cooling system, said liquid cooling system including a water pump, said engine including a drive shaft for driving said water pump and a driving connection between said drive shaft and said pump, said driving connection including a pulley having a groove with flat bottom and side walls formed therein, a complementary shaped belt received within said groove thereby providing a slipping drive connection between the drive shaft and the water pump when the water pump is frozen, compressible means disposed within said spaces for accommodating freezing of the liquid coolant in the spaces, hollow radiator means connected in communication with said engine cooling spaces, said radiator having deformable means for accommodating for freezing of liquid coolant in the radiator, and means for heating at least a portion of the interior of said radiator for thawing frozen coolant, and a relief valve formed in the outer wall of said body means, said valve being adapted to open when subjected to a predetermined pressure.

References Cited in the file of this patent
UNITED STATES PATENTS

| | | |
|---|---|---|
| 1,270,101 | Basel | June 18, 1918 |
| 1,374,021 | McNeely | Apr. 5, 1921 |
| 1,580,633 | Atzberger | Apr. 13, 1926 |
| 2,137,231 | Asper | Nov. 22, 1938 |